US000001381H

United States Statutory Invention Registration [19]

[11] Reg. Number: H1381

Leavitt et al.

[43] Published: Dec. 6, 1994

[54] OMNIDIRECTIONAL FLEXIBLE JOINT FOR ROCKET NOZZLES

[76] Inventors: Keith H. Leavitt, 2343 N. 675 East, North Ogden, Utah 84414; Jerry E. Fonnesbeck, 764 N. 2nd West, Logan, Utah 84321; Frederick W. DuVall, 1470 E. 2525 North, Ogden, Utah 84414

[21] Appl. No.: 669,736

[22] Filed: Mar. 14, 1991

[51] Int. Cl.[5] ..... B63H 11/10; B64C 15/00

[52] U.S. Cl. ..... 239/265.19; 239/265.35

[58] Field of Search ..... 239/265.19, 265.33, 239/265.35, DIG. 19

[56] References Cited

U.S. PATENT DOCUMENTS

| | | | |
|---|---|---|---|
| 3,390,899 | 7/1968 | Herbert et al. | 239/265.35 |
| 3,519,260 | 7/1970 | Irwin | 239/265.35 |
| 3,726,480 | 4/1973 | Miltenberger | 239/265.19 |
| 3,877,646 | 4/1975 | McCullough et al. | 239/265.19 |
| 4,007,245 | 2/1977 | Scola | 264/36 |

*Primary Examiner*—David Brown

[57] ABSTRACT

An improved multiple-layered omnidirectional flexible joint disposed to flexibly connect between a convex spherical ball surface associated with a rocket motor nozzle and a concave spherical cup surface associated with a rocket motor case, the space between curved mounting surfaces being filled by overlapping spherically concentric layers constructed in an alternating manner of relatively rigid and relatively resilient materials interleaved and bonded to one another. The rigid layers are made of glass-fiber-reinforced epoxy-resin composite material, and extend outward beyond the edges of the resilient layers, so as to protrude toward the hot environment within the rocket motor case. The protruding edges of the glass-epoxy composite material layers tend to melt together, and thereafter protect the resilient layers from direct exposure to the intense thermal environment within the rocket motor case.

8 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OMNIDIRECTIONAL FLEXIBLE JOINT FOR ROCKET NOZZLES

FIELD OF THE INVENTION

This invention relates to omnidirectional pivotally flexible supports for rocket motor nozzles, and more particularly but without limitation thereto to an integral thermal shielding improvement to multiple-layered two-degree-of-freedom pivotally flexible joints used for pivoting a solid-propellent-powered rocket motor nozzle for the purpose of thrust vector control.

BACKGROUND OF THE INVENTION

A prior-art multiple-layered omnidirectional flexible joint for rocket nozzles is shown in FIG. 1 of U.S. Pat. No. 3,390,899 to Herbert et al. (hereinafter referred to as Herbert), which is hereby incorporated by reference. That flexible joint (identified by element number 26 as illustrated in FIG. 1 of Herbert) consists of alternating overlapping and coextensive layers of relatively resilient (hereinafter designated simply as "resilient") and relatively rigid (hereinafter designated simply as "rigid") material. A surrounding flexible thermal boot (element number 46, same illustration) is required to shield the joint from the intense heat that is developed within the case of the operating rocket motor.

The requirement for the thermal boot (or for any other type of separate heat shield) increases the complexity and the cost of the prior art flexible installation. Therefore there is a need for a flexible joint design that does not require the installation of a separate heat shield.

OBJECTS, FEATURES, AND ADVANTAGES

It is an object of the present invention to provide an improved flexible joint that will tolerate direct exposure to the environment within an operating solid propellant rocket motor case.

It is another object of the present invention to provide an improved flexible joint that will reduce the overall cost and complexity of the joint installation.

It is a feature of the present invention to extend the rigid layers of the flexible joint outward beyond the edges of the resilient layers, so as to protrude toward the hot environment within the rocket motor case.

It is another feature of the instant invention to make the rigid layers out of glass-fiber-reinforced epoxy-resin composite material (hereinafter designated as "glass-epoxy composite material").

It is yet another feature of the present invention to make the rigid layers of the joint thicker than the interleaved layers of resilient material.

It is an advantage of the present invention that the protruding edges of the extended rigid glass-epoxy composite material layers tend to melt together, and thereafter protect the resilient material from direct exposure to the intense thermal environment.

SUMMARY OF THE INVENTION

The present invention provides an improved omnidirectional flexible joint that can be used in an intense thermal environment without the need for a separate heat shield. The improvement consists of a simple design modification that brings about a non-obvious beneficial result. When the rigid-material layers are made of glass-epoxy composite material, and are extended outward beyond the edges of the resilient (e.g. rubber) layers, the protruding edges of the rigid layers tend to melt together and thereby protect the resilient material from the heat generated within the operating rocket motor case.

The glass-epoxy composite material provides an additional thermal benefit, as (when compared to such alternative materials as metals or graphite-based composites, each having a higher thermal conductivity) it reduces the conduction of heat into the joint.

BRIEF DESCRIPTION OF THE DRAWINGS

FIG. is a side elevation view, partly in section, of a portion of a rocket motor assembly wherein the present improved flexible joint is used to connect the rocket motor nozzle to the rocket motor case, thereby enabling the nozzle to be pivoted for the purpose of thrust vector control.

DESCRIPTION OF THE PREFERRED EMBODIMENT

Figure 1:
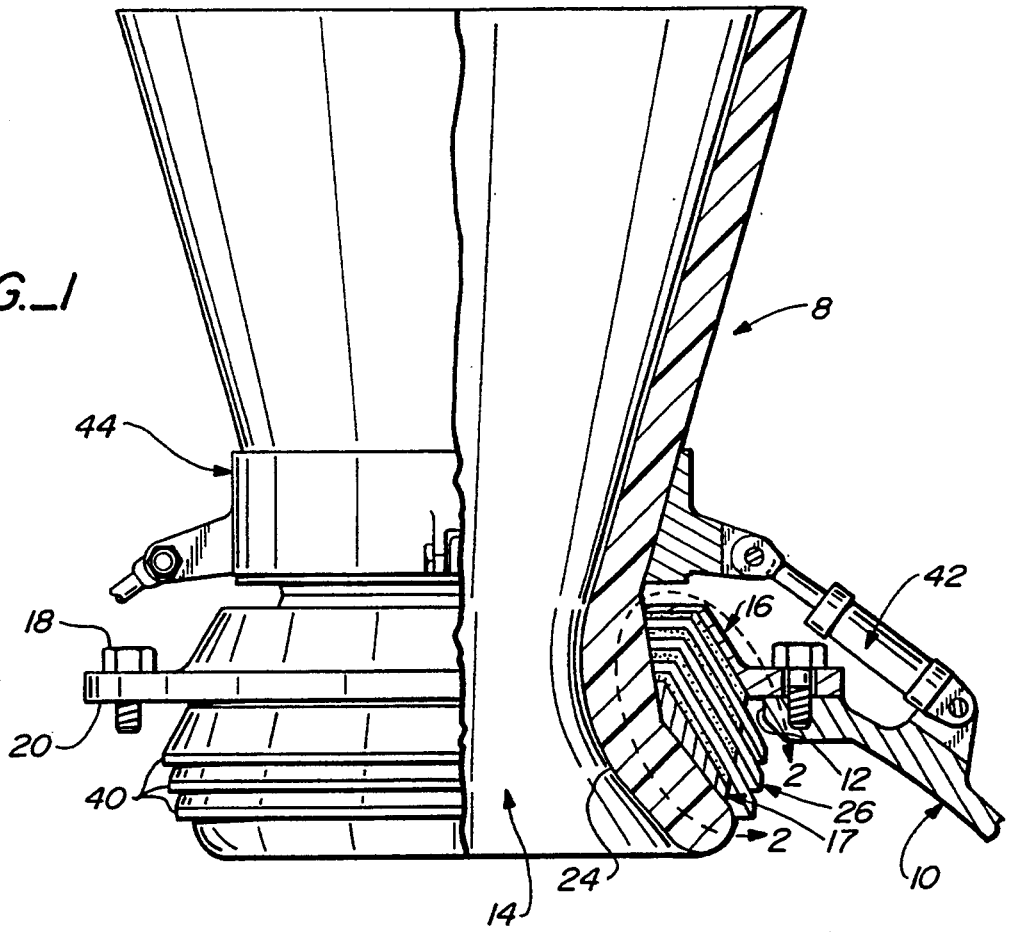

Referring now to the drawings wherein like reference numerals are used to designate like or corresponding parts throughout the various figures thereof, there is shown in FIG. 1 a portion of a solid-propellant-powered rocket motor assembly 8 having a rocket motor case 10 with a discharge opening 12, and a rocket motor convergent-divergent expansion nozzle 14 partially submerged with the opening 12.

An adapter band 17 made of a suitable material (an example of a suitable material would be using the identical material that the nozzle it is attached to is made from) is shown mounted on and surrounding the nozzle 14 near the restricted nozzle region 24. The band 17, shown in greater detail in FIG. 2, has an innermost surface 21 adapted for attaching to the nozzle 14 by attachment means (for example, by adhesive bonding), and has an outermost convex spherically curved ball surface 36; the center of curvature of ball surface 36 is located on the thrust axis of nozzle 14 at an axial location corresponding to the desired effective pivot point. Alternatively the ball surface 36 could be simply an integral portion of the nozzle 14 exterior wall.

An adapter ring 16 made of a suitable material (for example, a titanium alloy) is placed around the case opening 12 and attached to the case 10 with a suitable fastening means such as bolts 18 which protrude through the flat ring-to-case attachment surface 20 of ring 16; ring 16 has an innermost concave spherically curved cup surface 22 which faces toward the constricted portion 24 of the nozzle 14 and surrounds and is concentric with the nozzle-mounted ball surface 36.

Figure 2:
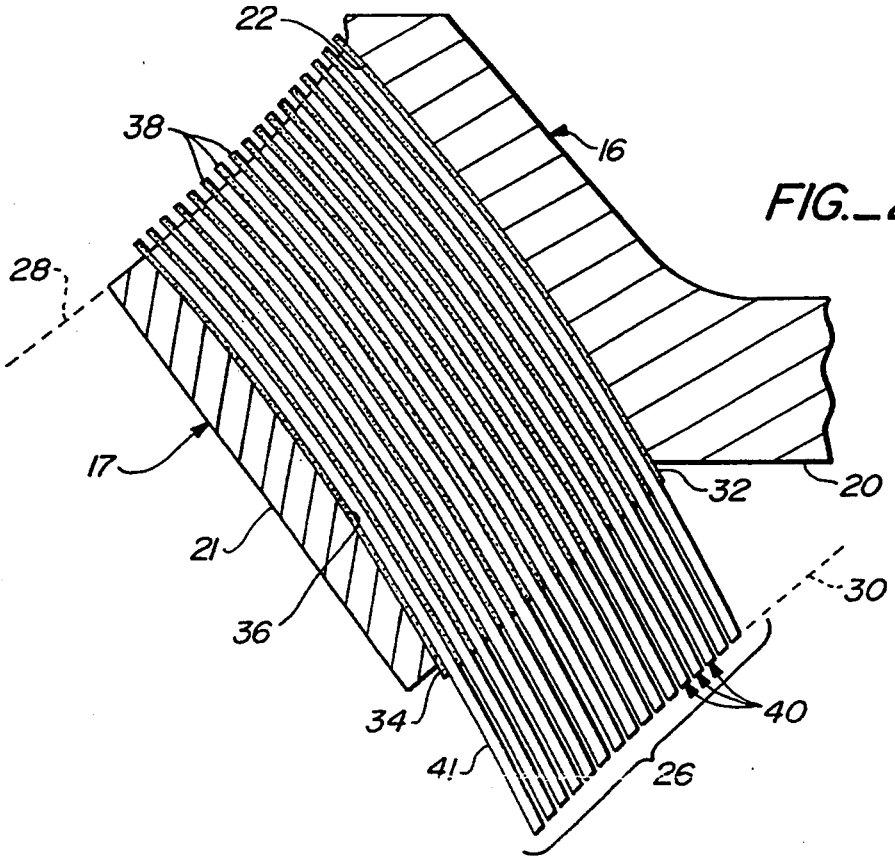
FIG. 2 is an enlargement of a portion of the rocket motor assembly that is shown in section and circumscribed by the heavy dashed lines labeled 2—2 in FIG. 1.

The flexible joint 26, the cross-section of which is shown in greater detail in FIG. 2 (shown attached to band 17 and ring 16), is of the overall geometric form of a solid of revolution; it surrounds the constricted portion 24 of the nozzle 14 and serves to flexibly joint the nozzle 14 to the motor case 10 (via adapter band 17 and adapter ring 16 as illustrated). Joint 26 has two generally conical surfaces, indicated by dashed lines 28 and 30 in FIG. 2, which represent the innermost and outermost free surfaces. Joint 26 also has two concentric generally spherical surface; outer convex spherical mounting surface 32 and inner concave spherical mounting surface 34.

Joint 26 is comprised of alternating spherically concentric layers 38 and 40 (each layer being effectively a segment of a spherical shell, geometrically analogous to layers of an onion) Layers 38 are made of relatively resilient material (for example an elastomer such as natural rubber); they are interleaved between and bonded to relatively rigid layers 40 made of glass-epoxy composite material. The innermost and the outermost layers 38 (having mounting surfaces 34 and 32 respectively) of the joint are of the resilient material, as resilient material is more suitable for being bonded to the corresponding mating spherical surfaces (i.e., ball surface 36 kinematically associated with nozzle 14, and cup surface 22 kinematically associated with motor case 10) upon installation.

The preferred composition of the relatively resilient material is the Thiokol Corporation's natural rubber elastomer formulation number TR-3005, consisting primarily (from 79.8 to 82.7 parts by weight) of Number 1 RSS standard quality ribbed smoked natural rubber sheet (this commercial designation for natural rubber is pursuant to the Malaysian Rubber Bureau standards), with the following additional ingredients (also parts by weight): from 4.98 to 5.02 parts zinc oxide, from 2.98 to 3.02 parts stearic acid, from 0.73 to 0.77 parts benzothiazyl disulfide, from 0.099 to 0.101 parts tetramethylthiuram disulfide, from 0.48 to 0.52 parts sulfur, from 1.18 to 1.27 parts trimethyl-dihydroquinoline, from 17.3 to 20.2 parts acrylonitrile butadiene copolymer, and from 0.98 to 1.02 parts medium thermal black.

The preferred glass-fiber-reinforced epoxy-resin relatively rigid material is obtained from the Composites Division of the Ferro Corporation, pursuant to Ferro designation CE9000/6581. 6581 is an industry-standard designation for basic strand weight and yarn construction for glass cloth. The dry glass fabric is woven from S-2/CG 150-½ glass yarn (where S-2 is the type of glass fiber, C means continuous filament, G refers to filament diameter class group, 150 refers to basic strand weight, and ½ means two twisted about one) into an 8-harness satin weave cloth having from 55 to 59 warp yarns and from 51 to 56 fill yarns. The preferred epoxy resin impregnant meets the requirements of military standard specification MIL-R-9300, Type 1 Grade C, Form A. CE9000 is the Ferro Corporation's designation for their own epoxy-resin impregnant.

The resilient layers 38 lie essentially only within the region between inner and outer mounting surfaces 34 and 32, as illustrated in FIG. 2. A portion 41 of each rigid layer 40 extends outward beyond this area, projecting toward the hot environment within the rocket motor case 10. The rigid layers 40 are generally thicker than the resilient layers 38 interleaved between them, the thickness ratio generally being within the range of from 1.05:1 to 2.10:1.

The rigid layers 40 are generally extended outward beyond the resilient layers 38 by a distance of approximately 10 to 20 times the thickness of the rigid layers 40.

For the preferred embodiment illustrated in FIG. 2, the thickness of each rigid layer 40 is 0.068 inches; the thickness of each resilient layer 38 is 0.045 inches. The total number of layers (number of resilient and rigid layers combined) is 35. The inside spherical radius (to surface 34) is 14.38 inches. The chord length (i.e., the length seen in cross-section in FIG. 2) for the resilient layers 38 is about 3.5 inches, and the chord length for the rigid layers is about 5.0 inches.

During flight the rocket motor nozzle 14 may be pivoted about the joint 26 by well-known means, for example by means such as the actuators 42 linked between the case 10 and the nozzle-mounted actuator attachment ring 44 illustrated in FIG. 1.

This invention is not limited to the preferred embodiment and alternatives heretofore descried, to which variations and improvements may be made without departing from the scope of protection of the present patent and true spirit of the invention, the characteristics of which are summarized in the following claims.

That which is claimed is:

1. In combination with a multiple-layered omnidirectional flexible joint disposed to be bonded to and flexibly connect between a convex spherical ball surface associated with a rocket motor nozzle and a concave spherical cup surface associated with a rocket motor case and concentric with and spaced from and extending around the exterior of the ball surface, said joint having an overall general shape in the form of a solid of revolution having an innermost spherically curved concave mounting surface disposed to be bonded to the ball surface and an outermost spherically curved convex mounting surface disposed to be bonded to the cup surface, the space between the innermost and outermost spherically curved mounting surfaces being filled by overlapping spherically concentric layers interleaved and bonded to one another, the material composition of adjacent layers being different from one another and alternating between relatively resilient material creating relatively resilient layers and relatively rigid material creating relatively rigid layers with the innermost and outermost layers being of the relatively resilient material, the relatively resilient layers lying essentially only within the region between the innermost and the outermost mounting surfaces, the improvement thereof wherein:

said relatively rigid material consists of a glass-fiber-reinforced epoxy-resin composite; and said relatively rigid layers extend outward beyond said relatively resilient layers.

2. In combination with a multiple-layered omnidirectional flexible joint as recited in claim 1, the further improvement thereof wherein said relatively resilient material consists of rubber elastomer formulation number TR-3005.

3. In combination with a multiple-layered omnidirectional flexible joint as recited in claim 1, the further improvement thereof wherein said relatively rigid layers are thicker than said relatively resilient layers, the thickness ratio generally being within the range of from 1.05:1 to 2.10:1.

4. In combination with a multiple-layered omnidirectional flexible joint as recited in claim 3, the further improvement thereof wherein said relatively resilient material consists of rubber elastomer formulation number TR-3005.

5. In combination with a multiple-layered omnidirectional flexible joint as recited in claim 1, the further improvement thereof wherein said relatively rigid layers extend outward beyond said relatively resilient layers by a distance of approximately 10 to 20 times the thickness of said relatively rigid layers.

6. In combination with a multiple-layered omnidirectional flexible joint as recited in claim 5, the further improvement thereof wherein said relatively resilient material consists of rubber elastomer formulation number TR-3005.

7. In combination with a multiple-layered omnidirectional flexible joint as recited in claim 5, the further improvement thereof wherein said relatively rigid layers are thicker than said relatively resilient layers, the thickness ratio generally being within the range of from 1.05:1 to 2.10:1.

8. In combination with a multiple-layered omnidirectional flexible joint as recited in claim 7, the further improvement thereof wherein said relatively resilient material consists of rubber elastomer formulation number TR-3005.

* * * * *